(12) United States Patent
Wesin et al.

(10) Patent No.: US 11,619,447 B2
(45) Date of Patent: Apr. 4, 2023

(54) THERMAL RECOVERY OR CLEANING OF SAND

(71) Applicant: FINN RECYCLING OY, Urjala (FI)

(72) Inventors: Toni Wesin, Urjala (FI); Timo Kronqvist, Urjala (FI)

(73) Assignee: Finn Recycling Oy, Nuutajärvi (FI)

( * ) Notice: Subject to any disclaimer, the term of this patent is extended or adjusted under 35 U.S.C. 154(b) by 0 days.

(21) Appl. No.: 16/759,045

(22) PCT Filed: Oct. 23, 2018

(86) PCT No.: PCT/FI2018/050776
§ 371 (c)(1),
(2) Date: Apr. 24, 2020

(87) PCT Pub. No.: WO2019/081815
PCT Pub. Date: May 2, 2019

(65) Prior Publication Data
US 2020/0333074 A1    Oct. 22, 2020

(30) Foreign Application Priority Data
Oct. 25, 2017   (FI) ..................................... 20175944

(51) Int. Cl.
*F27B 7/36*   (2006.01)
*B03C 1/30*   (2006.01)
(Continued)

(52) U.S. Cl.
CPC ............... *F27B 7/362* (2013.01); *B03C 1/30* (2013.01); *B08B 7/0071* (2013.01); *B08B 7/04* (2013.01);
(Continued)

(58) Field of Classification Search
CPC ...................................................... F27B 7/362
See application file for complete search history.

(56) References Cited

U.S. PATENT DOCUMENTS 2,326,218 A * 8/1943 Hartley ..................... B22C 5/18
                                                         134/2
2,983,051 A * 5/1961 Zimmermann ........... F28C 3/14
                                                         34/171
(Continued)

FOREIGN PATENT DOCUMENTS

CN          104043772       9/2014
CN          203956000       11/2014
(Continued)

OTHER PUBLICATIONS

WO-2017090258-A1 English Translation, accessed on Mar. 2021. (Year: 2017).*
(Continued)

*Primary Examiner* — Nathaniel Herzfeld
(74) *Attorney, Agent, or Firm* — Nixon & Vanderhye PC

(57) ABSTRACT

In the disclosed solution sand to be cleaned is thermally cleaned by rotating the sand being cleaned in a large oven (1) by rotating the oven (1). Before cleaning, the sand may be pre-processed by crushing any lumps and cleaning the sand fraction by magnetic separation. Preprocessed sand to be cleaned and heat energy are fed (5) into the rotating oven. The oven (1) is set slightly inclined so that a second end of the oven (1) is lower than a first end. The inclination and rotating speed of the oven (1) as well as the feed amount of sand are adjusted, whereby the advancing speed of the sand may be adjusted, as well as the ratio of the sand being cleaned to the volume of the oven (1) kept as desired. The temperature of the oven (1) is monitored at the coldest area of the oven, which is substantially at the second end of the oven. The temperature of the oven (1) is adjusted by adjusting the amount of heat energy fed in. By means of temperature monitoring and knowing the advancing speed of the sand, it is also possible to determine the average temperature of the sand and adjust it as desired by adjusting the
(Continued)

supplied heat energy. Finally, the cleaned sand is let run (12) from the second end of the oven (1).

21 Claims, 3 Drawing Sheets

(51) Int. Cl.
| | | |
|---|---|---|
| *B08B 7/00* | (2006.01) | |
| *B08B 7/04* | (2006.01) | |
| *B22C 5/04* | (2006.01) | |
| *B22C 5/06* | (2006.01) | |
| *F23G 5/08* | (2006.01) | |
| *F27B 7/12* | (2006.01) | |
| *F27B 7/20* | (2006.01) | |
| *F27B 7/42* | (2006.01) | |
| *B09B 3/40* | (2022.01) | |

(52) U.S. Cl.
CPC ............... *B09B 3/40* (2022.01); *B22C 5/04* (2013.01); *B22C 5/06* (2013.01); *F23G 5/08* (2013.01); *F27B 7/12* (2013.01); *F27B 7/20* (2013.01); *F27B 7/36* (2013.01); *F27B 7/42* (2013.01); *B03C 2201/20* (2013.01)

(56) References Cited

U.S. PATENT DOCUMENTS

| | | | | |
|---|---|---|---|---|
| 3,170,786 | A * | 2/1965 | Moklebust | C21B 13/08 75/480 |
| 3,929,463 | A * | 12/1975 | Svensson | C22B 23/021 75/435 |
| 4,144,088 | A | 3/1979 | Adams | |
| 4,974,528 | A * | 12/1990 | Barcell | B09C 1/06 110/226 |
| 5,404,655 | A | 4/1995 | Godderidge et al. | |
| 5,579,334 | A * | 11/1996 | Baxter | F27B 7/00 373/109 |
| 5,619,936 | A | 4/1997 | Veltmann | |
| 2010/0181042 | A1 | 7/2010 | Seeber et al. | |
| 2011/0109021 | A1* | 5/2011 | Cain | C22B 1/2406 266/44 |
| 2014/0147799 | A1* | 5/2014 | Peterman | F27B 7/34 432/36 |
| 2015/0211794 | A1* | 7/2015 | Caro | F27B 7/20 432/11 |
| 2017/0326622 | A1* | 11/2017 | Suzuki | F23G 5/20 |

FOREIGN PATENT DOCUMENTS

| | | |
|---|---|---|
| CN | 107107165 | 8/2017 |
| EP | 0 415 539 | 3/1991 |
| EP | 0 656 236 | 6/1995 |
| WO | 2015/033311 | 3/2015 |
| WO | 2016/031529 | 3/2016 |
| WO | 2017/090258 | 6/2017 |
| WO | WO-2017090258 A1 * | 6/2017 ............... B22C 5/00 |

OTHER PUBLICATIONS

Office Action issued in CN Appln. No. 201880069570.2 dated Jun. 2, 2021 (w/ translation).
Examination report issued in IN App. No. 202017019542 (dated Apr. 5, 2021).
Search Report for Finnish Application No. 20175944 dated May 25, 2018, 2 pages.
International Search Report and Written Opinion of the ISA for PCT/FI2018/050776 dated Jan. 29, 2019, 14 pages.
Extended European Search Report dated Aug. 3, 2021 in corresponding European Application No. 18869873.2, 6 pages.

* cited by examiner

THERMAL RECOVERY OR CLEANING OF SAND

This application is the U.S. national phase of International Application No. PCT/FI2018/050776 filed Oct. 23, 2018 which designated the U.S. and claims priority to FI Patent Application No. 20175944 filed Oct. 25, 2017, the entire contents of each of which are hereby incorporated by reference.

BACKGROUND OF THE INVENTION

The invention relates to a method and apparatus for thermal recovery or cleaning of sand, foundry sand, used at a foundry.

In prior art methods, thermal recovery of similar sand uses a so-called fluidised-bed boiler in which a powerful air stream is fed upwards from a bottom part of a furnace. The air stream causes the sand to be cleaned, ash, and fuel used for heating to float.

A drawback with the arrangement described in the above is a slow process, high costs, and high wastage per each ton of cleaned sand. An alternative to cleaning is imported sand. Imported sand is for the most part brought in from Central Europe. It has been collected from the bottom of the Atlantic and cleaned. The starting point is that imported sand needs to be brought in at least as much as the wastage is. Imported sand, or sand adequately cleaned and already at least once used at a foundry, is used in founding by approximately 30% of the total amount of sand, because sand which has been cleaned mechanically, only, cannot be put in direct contact with a casting due to impurities therein. Examined in the ecological sense, it would be worthwhile to develop the cleaning process so that the need for imported sand is reduced and the consumption of energy used in cleaning is decreased.

BRIEF DESCRIPTION OF THE INVENTION

The object of the invention is thus to develop a new method and an apparatus implementing the method, which are characterized by what is stated in the independent claims. Preferred embodiments of the invention are disclosed in the dependent claims.

In the solution put forth, the sand to be cleaned is thermally cleaned by rotating the sand being cleaned in a large, slightly inclined oven by rotating the oven. Before cleaning, the sand may be pre-processed by crushing any lumps and cleaning the sand fraction by magnetic separation. In the solution, the oven is set slightly inclined so that a second end of the oven is lower than a first end. In the solution, mechanically pre-processed sand to be cleaned and hot air, or heat energy, is fed to a rotating oven. The sand to be cleaned is fed into the oven for cleaning advantageously at the first end of the oven. The inclination and rotating speed as well as the feed amount of sand are adjusted, whereby the advancing speed of the sand may be adjusted as well as the ratio of the sand being cleaned to the volume of the oven kept as desired. The temperature of the oven is advantageously monitored at the coldest area of the oven, which is substantially at the lower, second end of the oven. The temperature of the oven is adjusted by adjusting the amount of heat energy being fed in. By means of temperature monitoring and knowing the advancing speed of the sand, it is also possible to determine the average temperature of the sand and adjust it as desired by adjusting the supplied heat energy. Finally, the cleaned sand is let run from the second end of the oven.

The cleaned sand may be conveyed by a liquid-cooled screw conveyor to be screened. Hot sand from the oven releases heat to a liquid flowing inside a double casing of the screw conveyor, whereby the sand cools down and the liquid warms up. Alternatively, it is possible to spray water to the forward and/or tail end of the screw conveyor to clean and cool down the sand.

In the disclosed solution, the cleaning of sand is faster when measured per a ton of sand cleaned, and the sand can be cleaned well, and the purity grade of the sand is uniformly high. The heat recovered at the screw conveyor may be used to preheat the sand, or as a heat source of a property. By means of dust removal and screening, sand also becomes cleaner and of a more uniform quality.

According to an embodiment, the temperature of the oven is adjusted by taking into account the purity grade of the sand, composition of dirt, or both of the above.

According to an embodiment, the temperature of the oven is adjusted by taking into account the required purity grade of the cleaned sand.

According to an embodiment, the temperature of the oven is adjusted by taking into account the amount of sand in the oven.

According to an embodiment, the temperature of the oven is adjusted by taking into account the advancing speed of the sand in the oven.

According to an embodiment, the temperature of the oven is kept at 400 to 900 degrees Celsius, as measured by a temperature sensor placed at the second end of the oven.

According to an embodiment, the temperature of the oven is kept at 550 to 750 degrees Celsius, as measured by a temperature sensor placed at the second end of the oven.

According to an embodiment, the inclination and rotating speed of the oven are adjusted so that a lead-time of 5 to 40 minutes is achieved for the sand through the oven, noting the purity grade of the sand.

According to an embodiment, the lead-time through the oven for the sand being cleaned is advantageously 10 to 30 minutes.

According to an embodiment, the lead-time through the oven for the sand being cleaned is advantageously 15 to 20 minutes.

According to an embodiment, based on the composition of the sand to be cleaned, obtained as initial data, after the crushing and magnetic separation in pre-processing, additive is added to the sand, based on the preliminary data acquired, by mixing the additive with the sand by a mixer.

According to an embodiment, the apparatus is additionally adapted to cool down the cleaned sand and to recover heat from it, and/or to remove dust from the cleaned sand.

The apparatus further comprises a screw conveyor to cool down the cleaned sand and to recover heat, and/or a screen part to remove dust and lumps from the cleaned sand.

According to an embodiment, the apparatus is further adapted to remove flue gasses from the second end of the oven and to cool down the flue gasses to recover heat.

According to an embodiment the apparatus is further adapted to use the heat recovered from the cleaned sand and flue gasses to preheat the sand and/or as the heat source of one or more properties.

BRIEF DESCRIPTION OF THE DRAWINGS

The invention is now described in greater detail in connection with the preferred embodiments and with reference to the attached drawing.

DETAILED DESCRIPTION OF THE INVENTION

Figure 1:
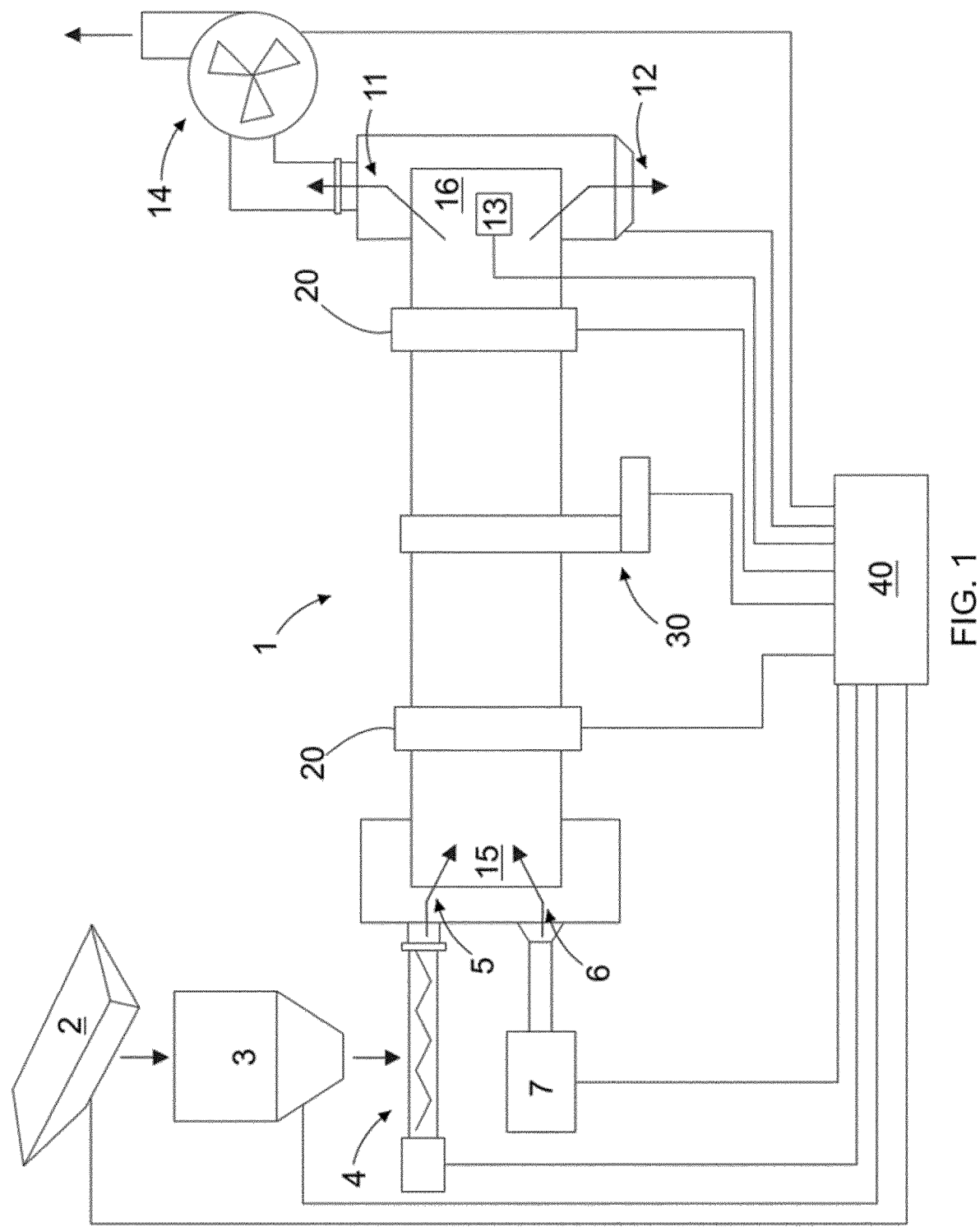
FIG. 1 shows an apparatus according to an embodiment for pre-processing and thermal recovery or cleaning of foundry sand.

Referring to the embodiment according to FIG. 1, lumpy sand to be cleaned passes through pre-processing 2 to a dosing feeder 3. The dosing feeder 3 feeds the sand to be cleaned to a conveyor 4, along which the sand moves 5 to the oven to be cleaned. The sand to be cleaned is fed into the oven for cleaning advantageously at a first end 15 of the oven. For example when the sand drops from the dosing feeder 3 and moves on the conveyor 4, magnetic separation and dust removal may be performed for it.

Heat energy produced by a heat source 7 is fed 6 to the oven 1. The heat energy fed to the oven is advantageously fed 6 to the oven 1 at the first end of the oven 1. Heat energy may be fed in at another location, too, such as at a second end of the oven 1 or the middle region of the oven 1. As concerns the feeding 6 of the heat energy and the conveying 5 of the sand, it is essential that the sand moving 5 into the oven can be heated up fast. The sand may be preheated external to the oven 1. The sand may be fed in the oven 1 at the first end 15 of the oven 1. Alternatively, the sand being moved to the oven 1 may be preheated within the oven 1 in a feed pipe, for example, which feed pipe enters the oven 1 advantageously at the centre region of the oven 1 or the second end 16, and the sand moves from the feed pipe to the oven to be cleaned advantageously at the first end 15 of the oven. Heat energy mat be fed to the oven 1 along a heat recovery system as best seen fit at each site. A liquid gas burner 7, for example, acts as the heat source. The oven 1 is in a thermal insulation material to reduce thermal loss. Thermal loss may be recovered and used, for example, for preheating the sand to be cleaned, or as a heat source of one or more properties. The oven 1 is substantially supported by supports 20. There are means advantageously arranged to the supports 20 for adjusting the inclination of the oven. The inclination adjustment arrangement may also have been implemented in another manner, to tilt the entire apparatus, for example. The most suitable solutions for adjusting the inclination of the oven 1 may be adapted on a case-by-case basis. The most essential thing is that is possible to adjust the inclination of the rotating oven 1. In addition, the apparatus has means 30 to rotate the oven 1 and to adjust the rotating speed.

Flue gasses are removed 11 from the second end 16 of the oven 1, with which some of the dust that the sand has brought with it is removed. With the flue gasses, impurities removed from the sand are also discharged. The flue gasses are processed with appropriate filter arrangements 14 and cooled down to recover heat. The temperature of the oven is measured at the second end 16 of the oven 1 with one of more temperature sensors 13, and thermally recovered or cleaned sand is let run 12 out of the oven 1.

The thermally recovered or cleaned sand may be let directly run, for example, to a collector, container, road tanker, pick up, sampling vessel, something else suitable for the purpose in question, or to any of the aforementioned through a conveyor or enclosed conveyor. If the sand is let run to an enclosed conveyor, in the enclosed conveyor more dust may be removed from the sand, and the sand may be transferred by the conveyor or another suitable carrier of transfer means further away from the oven 1 either to be stored in appropriate containers or transport equipment to be delivered further to foundry use of another suitable use. What is essential is that the foundry sand is, after the cleaning selected for it at any one time, fit for reuse. When foundry sand is cleaned it usually contains impurities, such as resin, that further the combustion process. This is why the temperature of the oven 1 must also be monitored with temperature sensors 13 when adjusting the amount of heat energy fed in 6, because when using the liquid gas burner 7, for example, the usual adjustments on the liquid gas burner 7 may prove out to be more effective due to the impurities furthering the combustion process.

One or more actuators of the apparatus are controlled by means of a control unit 40. The control unit 40 also monitors the values of the detectors and sensors in the apparatus, and utilizes the information when controlling the actuators. The control unit 40 may also be provided with different kind of starting data, initial data. The control unit 40 is part of a control room hooked up in connection with the apparatus, from which the operation of the apparatus may be managed by means of user interface of different kind. Control room solutions of different kind are known per se, so for that reason they are not described in closer detail in this context.

The measured and initial data of the sand to the cleaned are fed to the control unit 40. The control unit 40 notes these when it determines the most suitable parameters for the different actuators in order to thermally recover or clean the batch of sand coming in to be processed at each particular time. As initial data may be given, among other things, the previous use of the sand, storage location or locations of the sand after the previous use, humidity content of the sand mass, or the temperature of the sand as measured by one or more sensors placed in the dosing feeder 3, for example. Previous use indicates what impurities there might be in the sand due to the previous use. The storage locations indicate what might have happened to the sand between the previous use and the cleaning carried out. The temperature before cleaning in turn helps the control unit 40 determine the sand temperature throughout thermal recovery or cleaning.

In addition to the initial data, details on the future planned use of the sand, or the desired purity grade of the cleaned sand are needed. A batch of sand may, for example, be recovered back to foundry use, so clean even that it replaces part of the virgin sand at the foundry, or even all of the virgin sand. So, virgin sand is sand used as the casting sand. Mechanically recovered casting sand, or foundry sand, may be used as filler sand in casting, but it is not considered at all usable as the actual casting sand or even part of the casting sand.

A batch of sand, or part of it, may also be cleaned somewhat more lightly, too, so that after cleaning the sand is no longer classified as waste but can be used for another use. Sand for further use at a foundry has specific limit values for, for example, the amount of dust. Of sand for another purpose, dust removal may be reduced, if so desired, or one or more dust removal stages left out altogether.

When foundry sand is cleaned, essential in the adjustment of the burner 7, in addition to monitoring the temperature of the oven 1, is at least the amount of sand fed in 5 the oven 1, its advancing speed in the oven 1 and cleaning requirement, as well as what sort of impurities there are in the sand, and how clean the obtained sand must be. If the advancing speed in increases, the amount of the heat energy fed in 6 must be increased. By increasing the advancing speed when a substantially similar outcome is aimed at, the temperature of the oven 1 must be made higher, which speeds up thermal recovery or cleaning. A higher temperature in the oven 1 possibly causes more heat losses, on the other hand the lead-time is accelerated. At too high a temperature sand begins to glaze. Consequently, there is reason to monitor thermal recovery or cleaning by using automation as a help, which also means that sensors, regulators, and meters of different kind are needed, and all of the automation, or at least most of automation, is controlled by means of a user interface in the control room.

When foundry sand is cleaned, there must be enough air space for the discharge of impurities. The impurities are removed 11 with the flue gasses, so the amount of sand in the oven 1 must be kept sufficiently low. In other words, the sand to air mixture ratio must also be monitored. The larger the amount of sand in the oven 1 is, the worse can the impurities from among the sand exit with the flue gasses. This being the case, in the case of sand recovered back to foundry use there may be 25 to 45% of sand out of the inner volume of the oven. Advantageously, the amount of sand may be approximately 30 to 35% of the inner volume of the oven 1. When determining the amount of sand and the rotating speed of the oven 1, it is also essential that the sand mass must not just flow along the bottom of the oven 1, which means that the rotating speed is too low in relation to the amount of sand being cleaned. If the rotating speed of the oven 1 is too high, the sand rotates on the circumference of the oven 1 with the oven 1. With a suitable rotating speed in relation to the sand mass being cleaned, the sand rises on the edging of the oven 1 up to such an extent that at some stage the sand mass detaches from the edge of the oven 1 and at least partly falls in the air. In such a case, the sand mass recovers thermally or cleans more evenly, because cleaning hot air is better mixed with the sand mass, that is, the sand being cleaned is better aerated and the impurities may better exit with the air.

The cleaned sand may be let run onto a conveyor, in a collecting receptacle, transport tank, dust removal or another place suitable for the purpose in question, such as heat recovery preceding transport or storage. Heat recovery may still be carried out from cleaned sand waiting for transportation or from stored sand.

According to an embodiment, an additive is added to pre-processed sand after magnetic separation to improve the cleaning of certain impurities in thermal recovery. The additives used must be very steadily mixed with the sand being cleaned. For such a purpose, mixers have been designed which are known per se and therefore not described in detail in this context. Mixing is important from the viewpoint of the outcome. The concentration of the additive should be constant as concerns the sand mass being cleaned. The recommended concentrations for kaoline-based additives, for example, are in the neighbourhood of 1 to 3% when fluidised-bed boilers are used, but it has been detected that when the inventive method and apparatus are used, similar results are obtained with significantly smaller amounts of additives, such as with an additive amount of less than 0.8% and advantageously with an additive amount as low as 0 to 0.3%. In other words, the method and apparatus according to the invention are so superior that whereas prior art requires 1 to 3% of additives, similar results are obtainable even without additives. The dosage of an additive is affected by the initial data measured and obtained from the sand to be cleaned.

According to an embodiment, the temperature of the oven 1 is adjusted by taking into account the average temperature of the sand to be cleaned.

According to an embodiment, the temperature of the oven 1 is adjusted by substantially taking into account the average temperature at the second end of the oven.

The average temperature of the sand need not be measured directly from the sand being cleaned, because it can be computationally determined in many different ways. In determining the average temperature of the sand, the following information, for example, may be used, determined by the control unit from the sensors and actuators: 1) oven 1 temperature at any one time, 2) amount of sand fed in 5 the oven 1 per each time unit, 3) advancing speed of the sand, 4) temperature of the sand to be cleaned as it is being fed 5 into the oven 1, 5) temperature of exiting 12 sand, 6) amount of heat energy fed in 6 at any one time, 7) heat losses in different parts of the apparatus, and 8) temperature of exiting 11 flue gasses.

According to an embodiment, the control unit 40 uses the information it has received concerning each time instant on the oven 1 temperature at any one time, amount of sand fed in 5 the oven 1, advancing speed of the sand, temperature of the sand to be cleaned as it is being fed 5 into the oven 1, temperature of exiting 12 sand, amount of heat energy fed in, heat losses in different parts of the apparatus, and temperature of exiting flue gasses as well as other possible measured values as return data to perform future controls and adjustments.

Therefore, the control unit 40 can, by means of the return data, make corrective adjustment actions, for example, in the control room to reach the target settings given to the control unit 40. From the control room, it is possible to determine, for example, target values for the average temperature of the sand, the cleaned sand that is let run 12, exiting 11 flue gasses, or any combination of the above. It is also possible to set a target for the advancing speed of the sand, and by monitoring the realized values obtained as the return data the control unit 40 is able to determine whether the target was realized and carry out required changes, if the realization calculated according to the return data does not correspond with the target.

Figures 2, 3:
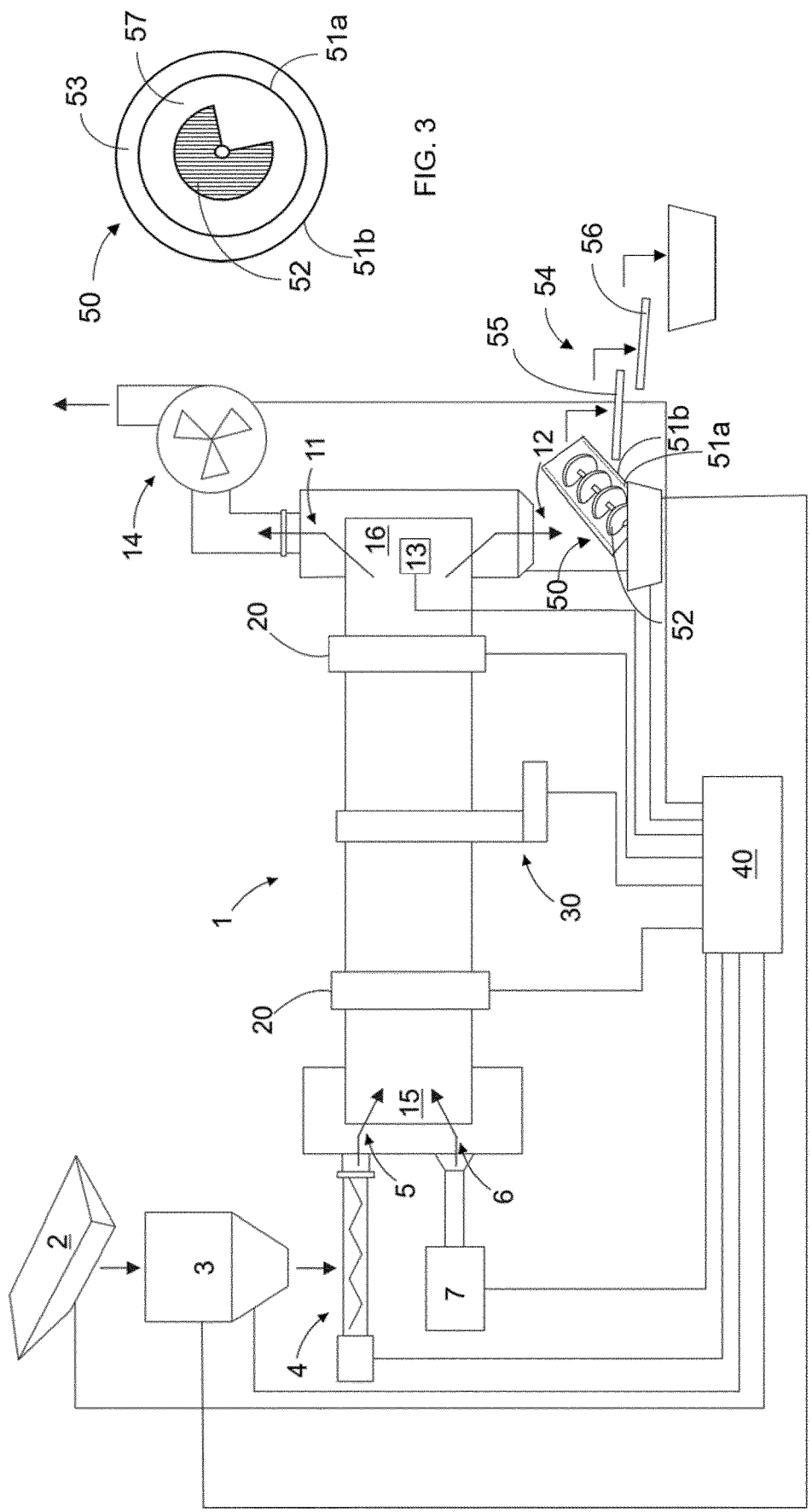
FIG. 2 shows an apparatus according to a second embodiment for pre-processing, thermal recovery or cleaning of foundry sand as well as cooling down and screening the sand obtained from an oven.
FIG. 3 is a cross section of the screw conveyor shown in FIG. 2.

FIG. 2 shows an apparatus according to an embodiment for pre-processing, thermal recovery or cleaning of foundry sand as well as cooling down and screening the sand obtained from an oven. According to an embodiment, the apparatus is adapted to cool down the cleaned sand and to recover heat from it, and/or to remove dust from the cleaned sand. FIG. 2 shows the apparatus according to FIG. 1, in which the sand thermally recovered or cleaned according to the above methods may additionally, after the processing, be let run 12 from the oven 1 on a screw conveyor 50 to cool down the hot sand and to recover heat. The flue gasses are also processed according to FIG. 1. With the flue gasses, part of the dust that the sand brought with it, and impurities removed from the sand are also discharged. The flue gasses are processed with appropriate filter arrangements 14 and cooled down to recover heat.

FIG. 3 shows a cross section of the screw conveyor 50 of FIG. 2, which comprises a worm part 52 having a double casing around it, the double casing comprising an inner casing 51*a* and an outer casing 51*b*. As seen in FIG. 2, the screw conveyor 50 may be inclined to an angle of 0° to 15°, advantageously the angle is 5°. The inclination is implemented in such a manner that the forward end 50 of the screw conveyor is lower than the tail end. The inclination slightly affects the lead-time of the sand, and the inclination may be adjusted with the control unit 40. The hotter the sand from the oven 1 is, the less is the screw conveyor 50 tilted. The screw conveyor 50 comprises a double casing around the worm part 52 to cool down the cleaned sand. The worm part 52 may be made of steel, but it is also possible to use other alloys or another adequately hard and durable material. The double casing or double section forms an intermediate space 53 in which a liquid or another substance effectively storing heat may flow around the worm part 52. As the liquid flowing in the intermediate space 53, water may advantageously be used, but other suitable substances, too. The inner and outer casing 51a, 51b of the double casing may be made of steel or another suitable material. The worm part 52 carries the sand forward in a space 57 between the worm part 52 and the double casing. As the worm part 52 is conveying hot sand forward from the oven 1, the heat that was present in the sand transfers through the inner casing 51a to the liquid circulating in the intermediate space 53 within the double casing, or to another substance whereby it warms up. This way the sand cools down and at the same time latent heat in the liquid or another substance may be conveyed elsewhere for a practical use, such as preheating 57 the sand (FIG. 4) and/or as a heat source of one of more properties. In cooling, the sand temperature may drop by 400 to 700°, whereby the final temperature of the sand is advantageously 200 to 300°. The liquid circulated in the intermediate space 53 of the double casing, such as cool water, is led in the double casing, and hot liquid warmed up by the sand is led out from there. Water is advantageously circulated in an amount of 12 cubic metres per hour.

According to an embodiment, the screw conveyor 50 only comprises the worm part 52 and inner casing 51a, thereby lacking the outer casing. In such a case, the sand is washed by spraying water into the sand, whereby the sand at the same time cools down. Water may be sprayed inside the inner casing 51a in the intermediate space 57 at the forward and/or tail end of the screw conveyor 50. This results in improved quality of the sand, because the washed sand is similar to new sand as to its quality. The water used for washing the sand warms up, whereby it may be recovered and used for sand preheating 57 and/or as a heat source of one or more properties.

In a second embodiment, the screw conveyor 50 comprises a double casing according to the embodiment shown in FIG. 2. In addition to this, sand may be washed by spraying water inside the inner casing 51a in the intermediate space 57 at the forward and/or tail end of the screw conveyor 50. This allows the sand to be washed and at the same time effective cooling down of the sand as well as heat recovery.

The apparatus shown in FIG. 2 comprises a screw conveyor 50 to cool down sand and to recover heat, and/or a screen part 54 to remove dust and lumps. The cooled down sand from the screw conveyor 50 is passed on to the screen part 54, which may comprise at least one mesh. According to an embodiment, the screen part 54 comprises a first and second mesh 55, 56, which may be located successively or at least partly overlapping. The meshes 55, 56 may be inclined to an angle of 0° to 15°, for example, advantageously the angle is 5°. The meshes are inclined so that the forward end of the meshes is higher than the tail end, whereby unfiltered sand moves forward under gravity as it is shaken. The inclination of the meshes 55, 56 may be adjusted with the control unit 40. The mesh size of the first mesh 55 may be between 0.06-0.15 mm, advantageously 0.1-0.15, most advantageously 0.1 mm. The mesh size of the second mesh 56 may be between 0.8-1.2 mm, advantageously 1.2. Both meshes 55, 56 may be shaken all the time, whereby the sand is filtered and moves forward at the same time. According to an embodiment, the screen part 54 also comprises an enclosure around the meshes 55, 56, which for reasons of clarity is not shown in the drawing. In addition, the screen part 54 may comprise one or more suction devices to suck out the dust coming off the sand. Advantageously one or more suction devices may be located at the top part of the enclosure, over both meshes 55, 56, and/or below both meshes 55, 56, whereby dust coming off during shaking may be efficiently sucked out both over and under the mesh. The screen part 54 may also comprise a watering system at the top part of the enclosure over one or both meshes 55, 56, used to water the sand on the meshes 55, 56, whereby the sand is cleaned and at the same time also cooled down more. The sand from the screen part 54 is stored or transported to a usage site in the manner shown in the solution according to FIG. 1.

Figure 4:
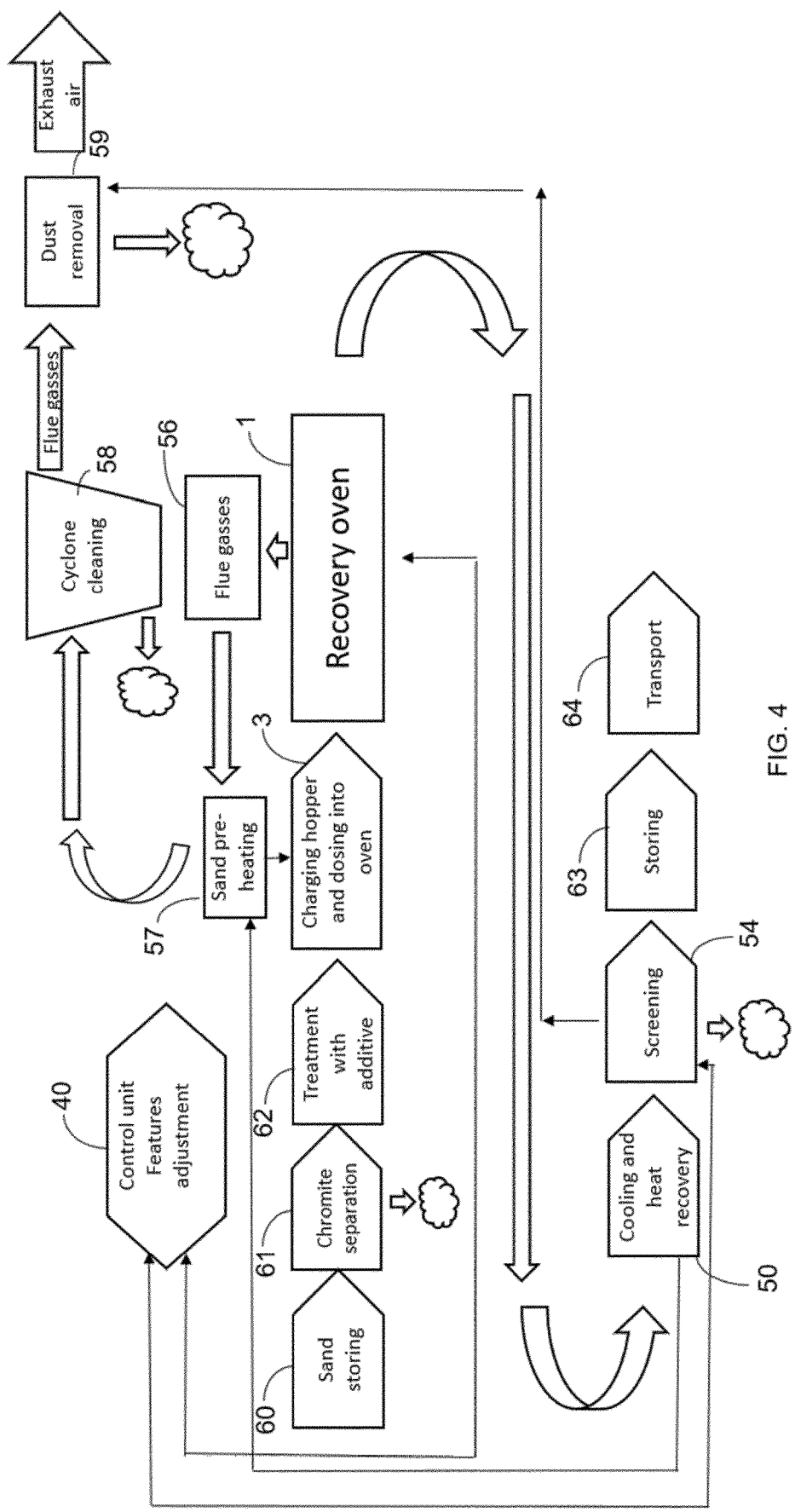
FIG. 4 shows a process chart according to an embodiment.

FIG. 4 shows a process chart according to an embodiment. In process implementation, the apparatuses according to FIG. 1 or 2 may be used, but in the process of FIG. 4 a cyclone 58 may additionally be used as a help in purifying the flue gasses. At the beginning of the process, chromite 61 is separated from the sand 60, and it may, if need be, treated with additives 62, following which the sand enters a charging hopper 3. The sand may be preheated 57 in the charging hopper 3 or in another convenient place, such as the oven 1. The sand is advantageously heated by means of the double casing around the charging hopper 3. In the double casing, hot combustion has and/or water may be circulated. After this, the sand moves on to the recovery oven 1 to be cleaned in a similar manner as in the apparatus according to FIG. 1. Thermally recovered or cleaned sand may after the processing be let run 12 from the oven 1 to the screw conveyor 50 to cool down the hot sand and to recover heat in accordance with the apparatus of FIG. 2 and the other embodiments disclosed in the above. The heat recovered from the screw conveyor 50 may be used to preheat 57 the sand, and/or as a heat source of one or more properties. In accordance with FIG. 2, the screen part 54 may also be used for dust and lump removal, after which the sand is stored 63 or transported 64 to a usage site. The control unit 40 is used, as shown in FIGS. 1, 2, and 4, to adjust the various features of the apparatuses, such as the inclination of the screw conveyor 50 and the flow of the liquid thereon, to adjust the inclination of the screen part 54 and the suction devices and watering system it has, as well as to adjust the heat directed to preheating 57 of sand, in addition to the features referred to in FIG. 1.

Flue gasses are removed from the oven 1, with which some of the dust that the sand has brought with it is removed. With the flue gasses 56, impurities removed from the sand are also discharged. Flue gasses 56 are led to sand preheating 57 and from there to cyclone cleaning 58. In sand preheating 57, the heat that was present in the flue gasses is led to the sand, whereby the flue gasses cool down. If it is not desired to employ sand pre-heating 57, the flue gasses 56 may be separately cooled down to recover heat and/or directly led to the cyclone. According to an embodiment, the apparatus is adapted to remove flue gasses from the second end 16 of the oven 1 and to cool down the flue gasses to recover heat. By means of the cyclone, the flue gasses 56 are brought to a rotating motion whereby dust and other impurities accumulated from the sand are gathered at the bottom of the cyclone, from where they can be removed. In cyclone cleaning 58 the remaining flue gasses are led on to dust removal 59, where the flue gasses may be processed with appropriate filter arrangements, if need be. According to an embodiment the apparatus is adapted to use the heat recovered from the screw conveyor 50 and flue gasses 56 to preheat the sand and/or as the heat source of one or more properties.

A person skilled in the art will find it obvious that, as technology advances, the basic idea of the invention may be implemented in many different ways. The invention and its embodiments are thus not restricted to the above-described examples but may vary within the scope of the claims.

The invention claimed is:

1. A method for cleaning sand used at a foundry, the method comprising:
   dosing the sand;
   feeding the dosed sand into a rotating oven, the rotating oven having an adjustable inclination and an adjustable rotating speed;
   feeding heat energy to the rotating oven via one or more heat sources;
   monitoring the temperature of the oven with one or more temperature sensors;
   adjusting the temperature of the oven based at least in part on the monitored oven temperature by adjusting the amount of heat energy fed in;
   adjusting the amount of sand fed in;
   adjusting the inclination and rotating speed of the oven to adjust an advancing speed of the amount of sand in the oven based at least in part on the amount of sand fed in and/or the monitored oven temperature;
   cooling down the cleaned sand and recovering heat via a screw conveyor, wherein the screw conveyor includes a double casing, and wherein heat from hot sand from the oven is releasable into a liquid flowing inside the double casing; and
   removing the cleaned sand from a second end of the oven.

2. The method as claimed in claim 1, wherein the temperature of the oven is adjusted based at least in part on a purity degree of the sand to be cleaned.

3. The method as claimed in claim 1, wherein the temperature of the oven is adjusted based at least in part on the amount of sand in the oven.

4. The method as claimed in claim 1, wherein the temperature of the oven is adjusted based at least in part on an advancing speed of the sand.

5. The method as claimed in claim 1, wherein the temperature of the oven is adjusted based at least in part on an average temperature of the sand.

6. The method as claimed in claim 1, wherein the amount of sand in relation to the volume of the oven is kept substantially the same when sand with a substantially similar purity degree is cleaned.

7. The method as claimed in claim 1, wherein the sand to be cleaned is phenolic resin sand, furnace resin sand, or bentonite resin sand.

8. The method as claimed in claim 1, wherein based on the composition of the sand to be cleaned, obtained as initial data, after a crushing and magnetic separation in preprocessing, an additive is additionally added to the sand, based on the initial data acquired on the composition of the sand to be cleaned, by mixing the additive with the sand by a mixer.

9. A non-transitory computer program product which comprises computer program code executable by a computer to perform the method defined in claim 1.

10. An apparatus for cleaning sand used at a foundry, comprising:
    a rotating oven which has means for adjusting an inclination and rotating speed of the oven;
    a feeding apparatus which has means for dosing the sand to be cleaned into the oven;
    a heating arrangement which has a least one or more temperature sensors and one or more heat sources;
    means for removing the cleaned sand from the oven at a second end of the oven, and
    a control unit for monitoring data conveyed by one or more sensors in the apparatus and for controlling one or more actuators by utilizing the monitored data conveyed by the one or more sensors,
    wherein the inclination and rotating speed of the oven is further adjustable to adjust an advancing speed of the sand in the oven based at least in part on the amount of sand fed in and/or the monitored oven temperature,
    the apparatus further comprising a screw conveyor to cool down the cleaned sand and to recover heat,
    wherein the screw conveyor includes a double casing, and wherein heat from hot sand from the oven is releasable into a liquid flowing inside the double casing.

11. The apparatus as claimed in claim 10, which apparatus is additionally adapted to remove dust from the cleaned sand.

12. The apparatus as claimed in claim 10, further comprising a screen part to remove dust and lumps from the cleaned sand.

13. The apparatus as claimed in claim 10, which apparatus is additionally adapted to remove flue gasses from the second end of the oven and to cool down the flue gasses to recover heat.

14. The apparatus according to claim 12, which apparatus is further adapted to use the heat recovered from the cleaned sand and flue gasses to preheat the sand and/or as the heat source of one or more properties.

15. The apparatus as claimed in claim 10, wherein the inclination and rotating speed of the oven is further adjustable to adjust an advancing speed of the sand in the oven based at least in part on both the amount of sand fed in and the monitored oven temperature.

16. The apparatus as claimed in claim 10, wherein the screw conveyor is liquid-cooled.

17. The apparatus as claimed in claim 10, wherein the double casing comprises an inner casing and an outer casing with an intermediate space therebetween, the liquid being provided in the intermediate space.

18. The apparatus as claimed in claim 10, wherein water is sprayable to a forward and/or tail end of the screw conveyor to clean and cool down the sand.

19. The apparatus as claimed in claim 18, wherein the screw conveyor comprises a worm part configured to carry the sand and a single casing around the worm part.

20. An apparatus for cleaning sand used at a foundry, comprising:
    a rotating oven which has means for adjusting an inclination and rotating speed of the oven;
    a feeding apparatus which has means for dosing the sand to be cleaned into the oven;
    a heating arrangement which has a least one or more temperature sensors and one or more heat sources;
    means for removing the cleaned sand from the oven at a second end of the oven, and
    a control unit for monitoring data conveyed by one or more sensors in the apparatus and for controlling one or more actuators by utilizing the monitored data conveyed by the one or more sensors, wherein the inclination and rotating speed of the oven is further adjustable to adjust an advancing speed of the sand in the oven based at least in part on the amount of sand fed in and/or the monitored oven temperature, the apparatus further comprising a screw conveyor to cool down the cleaned sand and to recover heat, wherein the screw conveyor has an inclination that is adjustable between upper and lower limits such that a forward end of the screw conveyor is adjustable to be lower than a tail end of the screw conveyor, and wherein the controller is configured to adjust the inclination of the screw conveyor such that the hotter the sand from the oven is, the less the screw conveyor is inclined.

21. The apparatus as claimed in claim 20, wherein the upper limit is 15 degrees and the lower limit is 0 degrees.

\* \* \* \* \*